(12) United States Patent
Oba et al.

(10) Patent No.: US 7,835,718 B2
(45) Date of Patent: Nov. 16, 2010

(54) SEMICONDUCTOR CIRCUIT FOR WIRELESS RECEIVING PROVIDED WITH CONTROLLER CIRCUIT FOR CONTROLLING BIAS CURRENT

(75) Inventors: Yasuo Oba, Shiga (JP); Hidehiko Kurimoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 559 days.

(21) Appl. No.: 11/951,071

(22) Filed: Dec. 5, 2007

(65) Prior Publication Data

US 2008/0139163 A1 Jun. 12, 2008

(30) Foreign Application Priority Data

Dec. 6, 2006 (JP) .............................. 2006-329028

(51) Int. Cl.
  H04B 1/16 (2006.01)
  H04K 3/00 (2006.01)
(52) U.S. Cl. .................................. 455/343.1; 455/574
(58) Field of Classification Search .............. 455/127.1, 455/343.1, 343.5, 571–574
See application file for complete search history.

(56) References Cited

U.S. PATENT DOCUMENTS 6,434,373 B2 * 8/2002 Ichihara .................... 455/127.5

7,711,395 B2 * 5/2010 Oba ........................... 455/574
2007/0032215 A1 2/2007 Oba

FOREIGN PATENT DOCUMENTS

| JP | 9-107299 | 4/1997 |
|----|----------|--------|
| JP | 2766230 | 4/1998 |
| JP | 2007-43444 | 2/2007 |

* cited by examiner

*Primary Examiner*—Lee Nguyen
(74) *Attorney, Agent, or Firm*—Wenderoth, Lind & Ponack, L.L.P.

(57) ABSTRACT

A constant voltage source supplies a bias current to a wireless receiver circuit. A bias current detector circuit detects the bias current, and outputs a detection result to a current controller circuit. The current controller circuit outputs the detection result of the bias current to a memory circuit. The current controller circuit controls the bias current detector circuit to stop operating thereof, and then controls the bias current to decrease when the detected bias current is larger than a predetermined first threshold value and controls the bias current to increase when the detected bias current is smaller than a second threshold value smaller than the first threshold value, based on the detection result stored in the memory circuit.

10 Claims, 6 Drawing Sheets

Fig.1 PREFERRED EMBODIMENT WIRELESS RECEIVER CIRCUIT 20

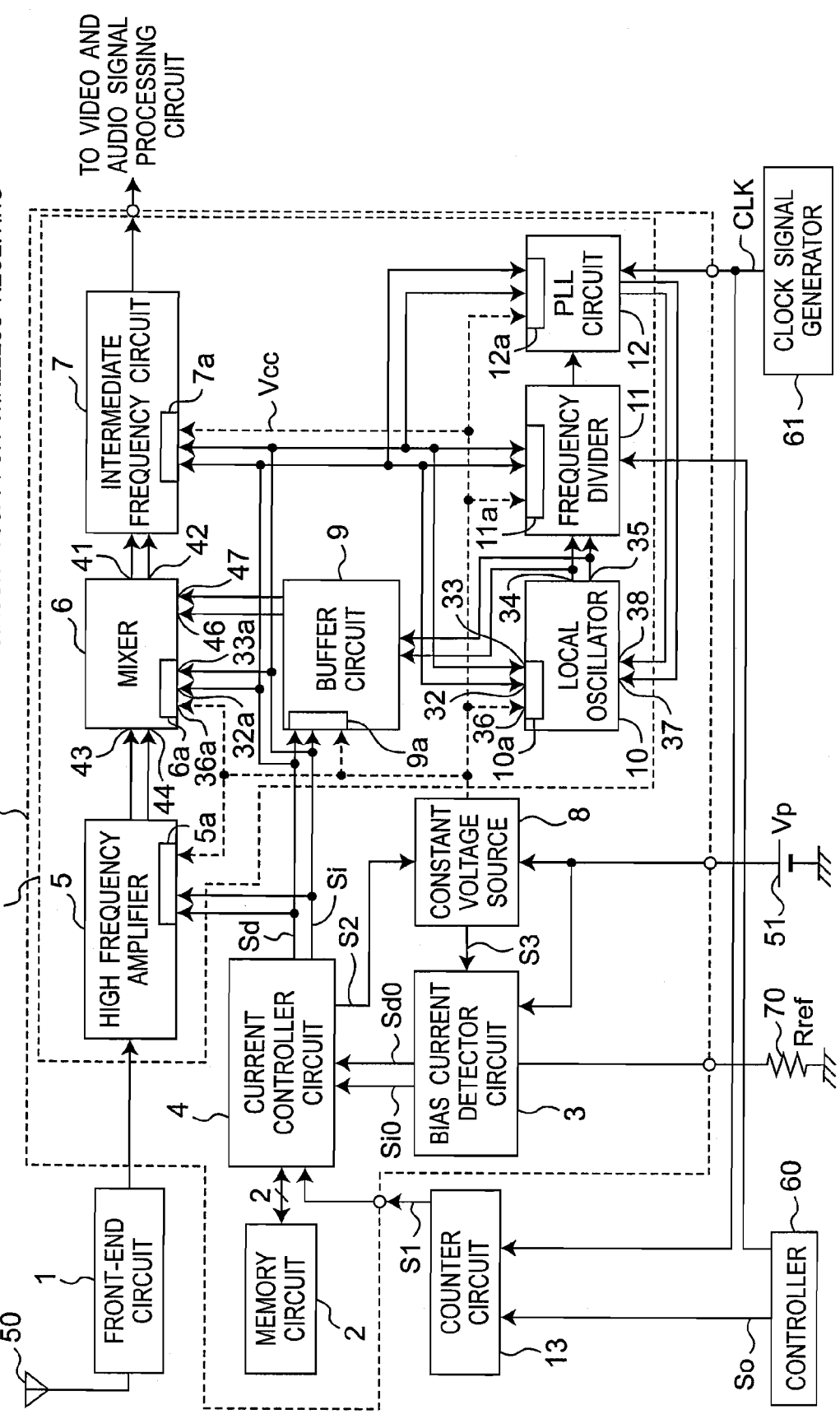
Fig. 6 MODIFIED PREFERRED EMBODIMENT OF PREFERRED EMBODIMENT

SEMICONDUCTOR CIRCUIT FOR WIRELESS RECEIVING PROVIDED WITH CONTROLLER CIRCUIT FOR CONTROLLING BIAS CURRENT

BACKGROUND OF THE INVENTION

1. Field of the Invention

The present invention relates to a semiconductor circuit installed in a wireless receiver apparatus such as a portable telephone, and to a wireless receiver apparatus including the semiconductor circuit for wireless receiving.

2. Description of the Related Art

Recently, various wireless receiver circuits have been installed in portable devices such as portable telephones driven with batteries, and such a demand has risen for greatly reducing consumption of power consumed in a wireless receiver circuit. However, power consumption of a receiver circuit for analog television broadcasting employed in an analog television broadcasting receiver according to a prior art is from several hundreds of milliwatts to over one watt, and the receiver circuit for the analog television broadcasting is unsuitable for a portable device driven with a battery. For example, in a receiver circuit for digital television broadcasting to be used in a future portable telephone, power consumption thereof is now required to be greatly smaller than the power consumption formerly required. The power consumption of, for example, 100 mW or smaller is required for the receiver circuit for digital television broadcasting. In order to meet this demand, most of circuits constituting a wireless receiver circuit are incorporated in a semiconductor integrated circuit. In this case, power consumption of the wireless receiver circuit depends on that of the semiconductor integrated circuit. For example, by reducing a power source voltage supplied to the wireless receiver circuit, the power consumption of the wireless receiver circuit can be reduced. However, a battery is often used as a power source of the portable device. Further, in view of efficiency for lowering a voltage of the battery, reduction in the power consumption is not always realized efficiently.

On the other hand, in a wireless receiver circuit including a high frequency circuit that includes a high frequency amplifier, a mixer, a local oscillator, a frequency divider, an intermediate frequency circuit and the like, a low frequency circuit, and a bias circuit, a frequency of a signal processed in the high frequency circuit is higher than those of signals processed in the lower frequency circuit and the bias circuit. In addition, a bias current flowing through the high frequency circuit is larger than bias currents flowing through the low frequency circuit and the bias current. The reasons are as follows. The resistance values of the resistors formed in the high frequency circuit are often set to be smaller so as to increase a bias current value, in order to lessen an influence of a parasitic capacity in the semiconductor integrated circuit. Further, important characteristics of a wireless receiver circuit such as a gain, a noise index, a dynamic range are generally more improved when the bias current value is larger. Accordingly, it is rather effective to reduce the bias current flowing through the high frequency circuit rather than to reduce the bias current flowing through the low frequency circuit and the bias circuit, in order to reduce the power consumption of the wireless receiver circuit.

Each of Japanese patent laid-open publication No. JP-9-107299-A and Japanese Patent No. 2766230 discloses a receiving amplifier apparatus including amplification means to which a bias current is applied for amplifying a received signal; received electric field detection means for detecting a received electric field level of the received signal; and control means for controlling the bias current according to the level of the received field so that a mutual modulation distortion falls in an allowable range and so as to realize low power consumption.

However, the manufacturing processes of the semiconductor integrated circuits varies relatively, and there are variations in the resistance values of the resistors and the current amplification factors of the transistors formed in the respective semiconductor integrated circuits. Accordingly, generally, the power consumption of the semiconductor integrated circuits vary from less than −20% to more than 20%, and a minimum value and a maximum value of the current consumption of the semiconductor integrated circuits often vary by a factor of 1.5 or more. Further, the circuit characteristics of the high frequency circuit often depend on the bias current value. In particular, if the bias current is excessively reduced, a fatal problem of oscillation stop occurs in an oscillator circuit such as a local oscillator included in the high frequency circuit. Due to this, reduction in current consumption is restricted by a lower limit of the variation in the consumed current, and this leads to one of problems in reduction in the power consumption. However, the receiving amplifier apparatus disclosed in each of the Japanese patent laid-open publication No. JP-9-107299-A and Japanese Patent No. 2766230 has no measures against the variation in current consumption. Further, the receiving amplifier apparatus disclosed in each of the Japanese patent laid-open publication No. JP-9-107299-A and Japanese Patent No. 2766230 has a disadvantage of inability to further reducing the power consumption since the bias current is always controlled while the receiving amplifier apparatus operates.

SUMMARY OF THE INVENTION

An essential object of the present invention is therefore to provide a semiconductor circuit for wireless receiving capable of solving the above-stated problems, and reducing power consumption as compared with prior arts even if the current consumption vary due to the variation in the manufacturing process of the semiconductor integrated circuits, and to provide a wireless receiver apparatus including the semiconductor circuit for wireless receiving.

According to the first aspect of the present invention, there is provided a semiconductor circuit for wireless receiving including a wireless receiver circuit for converting a wireless received signal having a predetermined radio frequency into an intermediate frequency signal, and outputting the intermediate frequency signal. In this case, the semiconductor circuit includes a bias current supply device for supplying a bias current to the wireless receiver circuit, a bias current detection device for detecting the bias current, and outputting a detection result, a storage device for storing the detection result, and a control device. After controlling the bias current detection device to stop operating thereof, the control device performs a control process for controlling the bias current to decrease when the detected bias current is larger than a predetermined first threshold value and for controlling the bias current to increase when the detected bias current is smaller than a second threshold value smaller than the first threshold value, based on the detection result stored in the storage device.

In the above-mentioned semiconductor circuit for wireless receiving, the bias current detection device preferably includes first, second and third current sources each supplying a predetermined identical constant current, a first resistor provided in the semiconductor circuit, and a second resistor provided in the semiconductor circuit. In this case, the first resistor is connected to the first current source and has a predetermined first nominal resistance value. The second resistor is connected to the second current source and has a predetermined second nominal resistance value smaller than the first nominal resistance value. In addition, the third current source is connected to a reference resistor. The reference resistor is provided outside of the semiconductor circuit, has a predetermined reference resistance value larger than the second nominal resistance value and smaller than the first nominal resistance value, and has an accuracy higher than those of the first resistor and the second resistor. Further, the bias current detection device detects the bias current based on not only a result of comparison of an induced voltage across the reference resistor with an induced voltage across the first resistor, but also a result of comparison of the induced voltage across the reference resistor with an induced voltage across the second resistor.

In addition, in the above-mentioned semiconductor circuit for wireless receiving, the control device preferably performs the control process when a power of the wireless receiver circuit is turned on.

Further, in the above-mentioned semiconductor circuit for wireless receiving, the control device preferably performs the control process when the radio frequency of the wireless received signal is changed.

Still further, the above-mentioned semiconductor circuit for wireless receiving preferably further includes a clock device for generating a mode switching signal indicating a predetermined time interval, and outputting the mode switching signal to the control device. In this case, the control device controls the bias current detection device to operate for the time interval in response to the mode switching signal, and then, performs the control process.

According to the second aspect of the present invention, there is provided a wireless receiver apparatus including the above-mentioned semiconductor circuit for wireless receiving.

According to the semiconductor circuit for wireless receiving and the wireless receiver apparatus including the semiconductor circuit for wireless receiving according to the present invention, after controlling the bias current detection device to stop operating thereof, the control device performs the control process for controlling the bias current. In the control process, the control device controls the bias current to decrease when the detected bias current is larger than the predetermined first threshold value, and controls the bias current to increase when the detected bias current is smaller than the second threshold value smaller than the first threshold value, based on the detection result stored in the storage device. Accordingly, the bias current detection device does not operate during the control process, and the current consumption of the semiconductor circuit for wireless receiving is smaller than that of the prior arts.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 6 is a block diagram showing a configuration of a wireless receiver apparatus including an integrated circuit 100A for wireless receiving according to a modified preferred embodiment of the preferred embodiment of the present invention.

DETAILED DESCRIPTION OF THE PREFERRED EMBODIMENTS

Preferred embodiments according to the present invention will be described below with reference to the drawings. In the attached drawings, the same numerical references denote components similar to each other.

Preferred Embodiment

Figure 1:
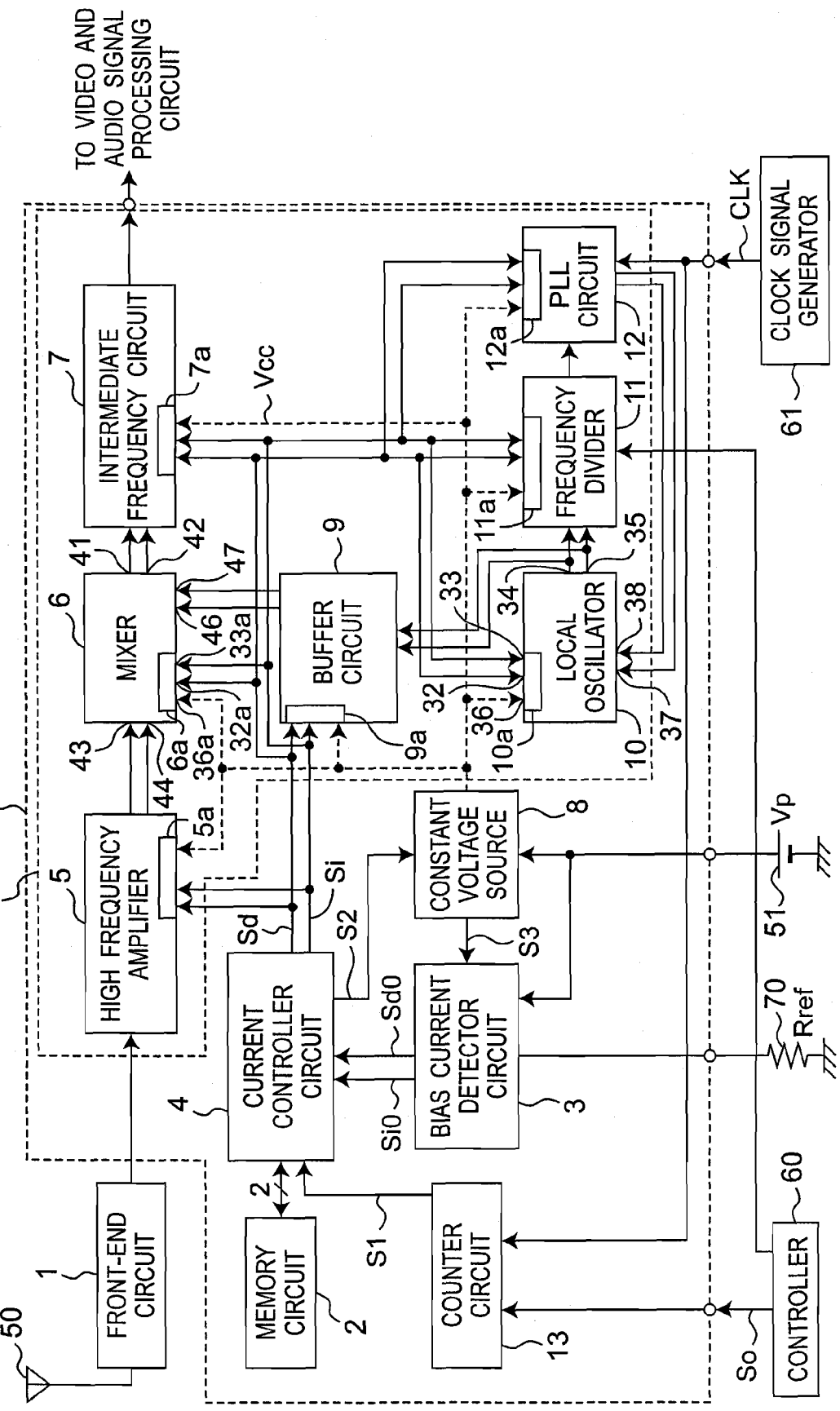
FIG. 1 is a block diagram showing a configuration of a wireless receiver apparatus including an integrated circuit 100 for wireless receiving according to a preferred embodiment of the present invention.
Figure 2:
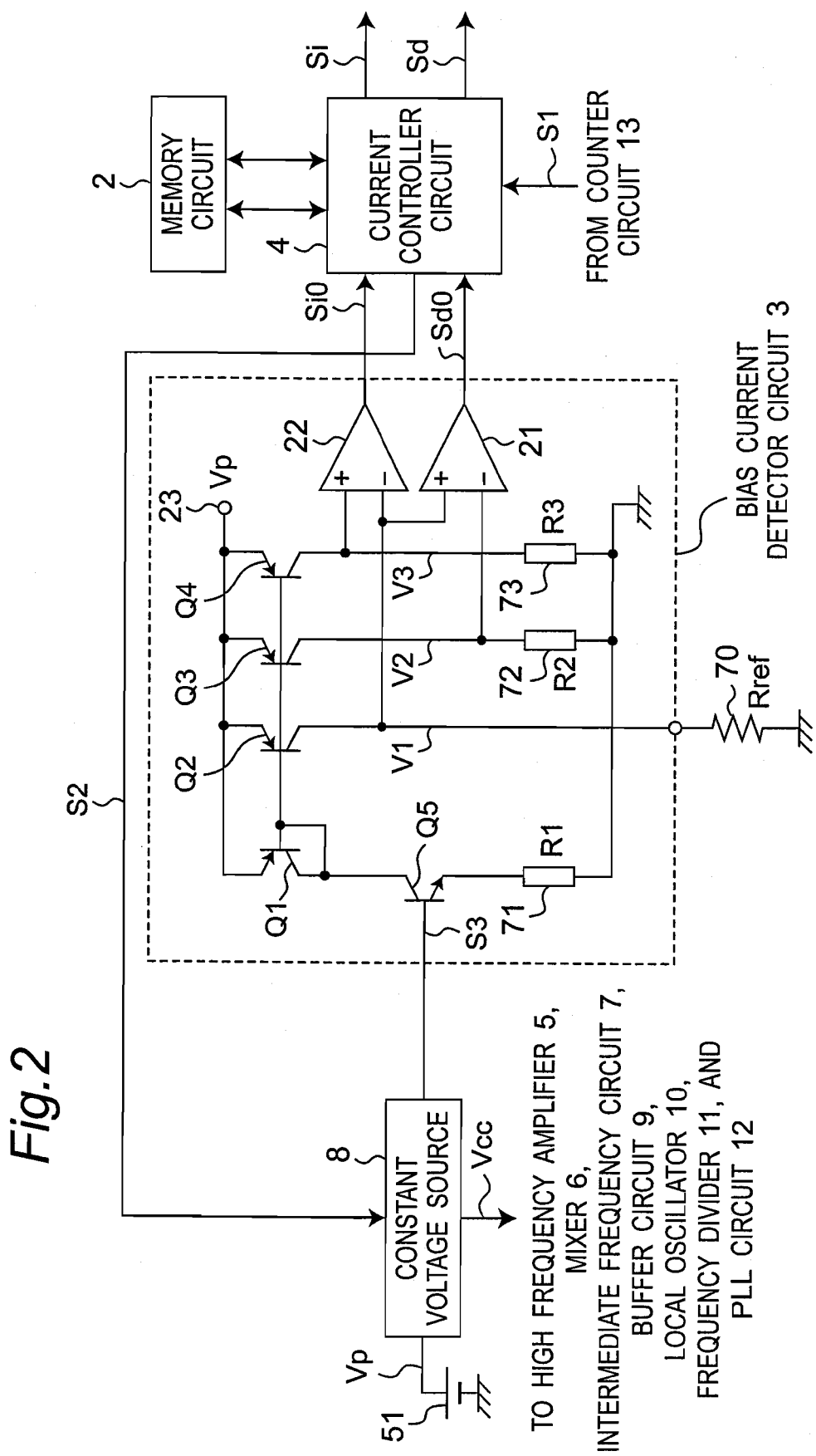
FIG. 2 is a block diagram showing a configuration of a bias current detector circuit 3 shown in FIG. 1.
Figure 3:
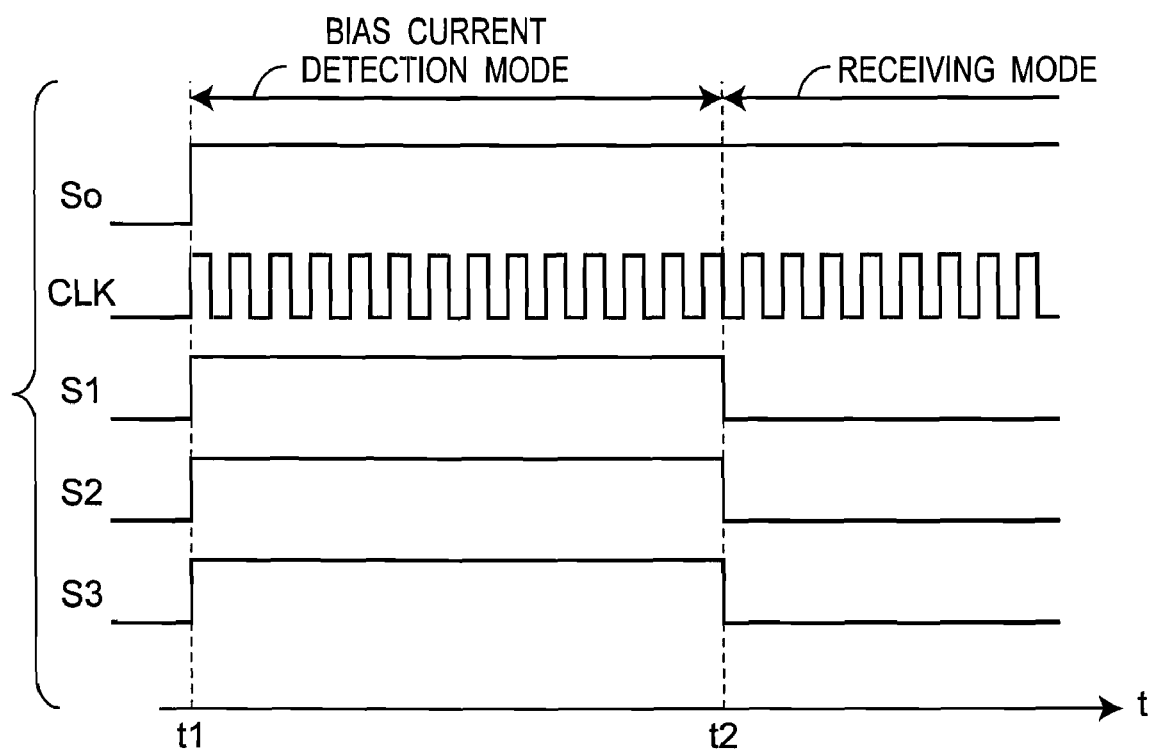
FIG. 3 is a timing chart showing an operation of the wireless receiver apparatus shown in FIG. 1.
Figure 4:
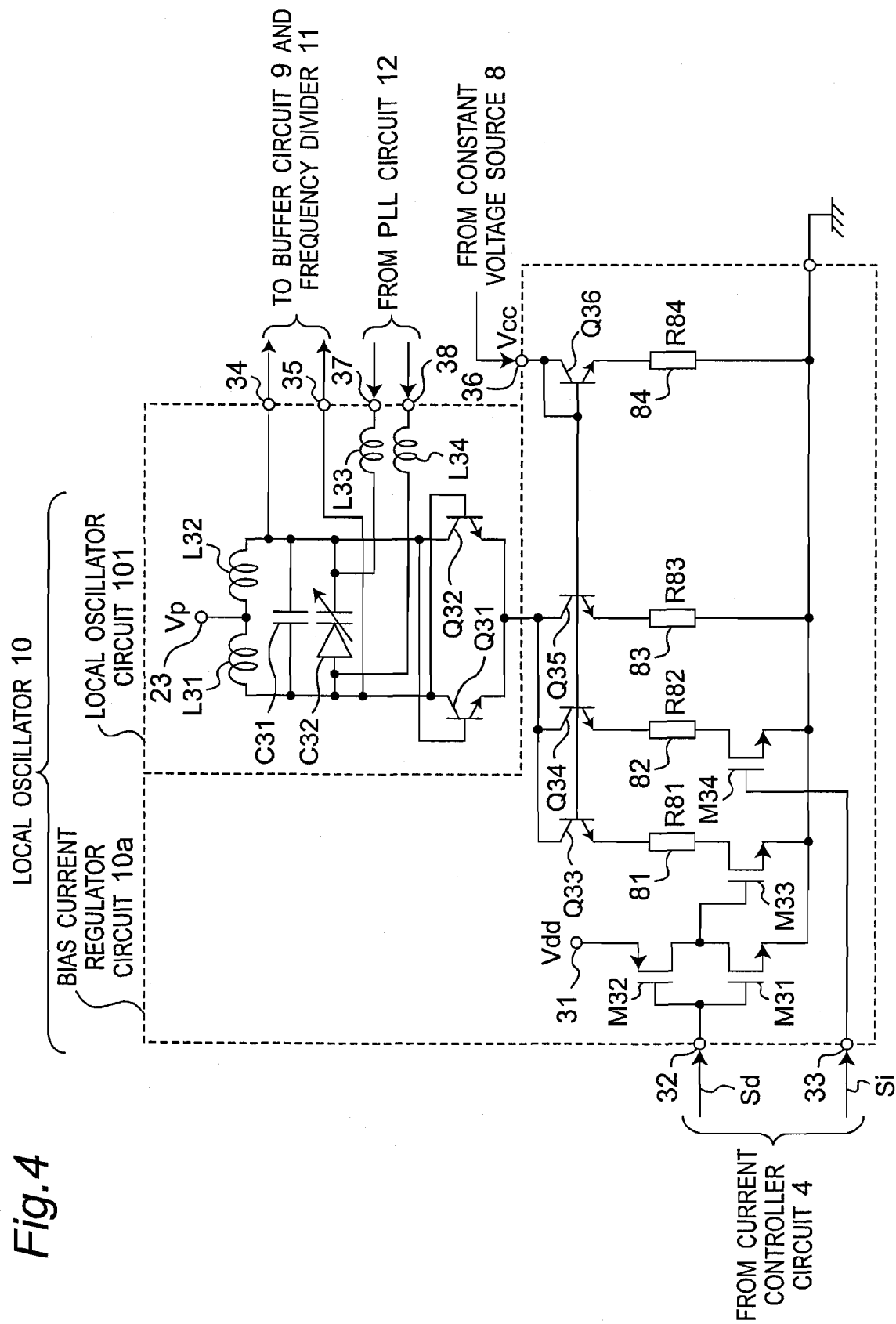
FIG. 4 is a block diagram showing a configuration of a local oscillator 10 shown in FIG. 1.
Figure 5:
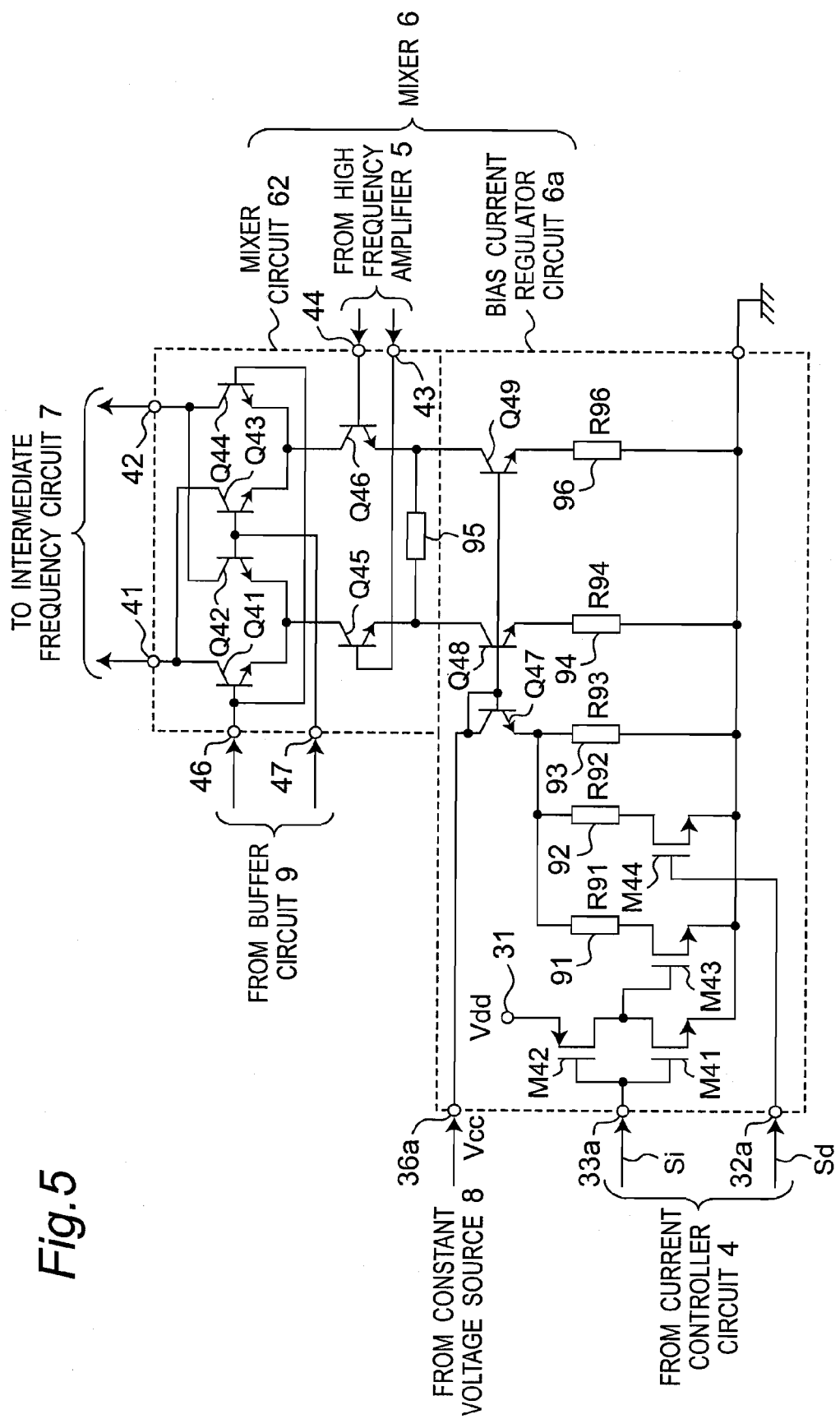
FIG. 5 is a block diagram showing a configuration of a mixer 6 shown in FIG. 1.

FIG. 1 is a block diagram showing a configuration of a wireless receiver apparatus including an integrated circuit 100 for wireless receiving according to a preferred embodiment of the present invention, and FIG. 2 is a block diagram showing a configuration of a bias current detector circuit 3 shown in FIG. 1. In addition, FIG. 3 is a timing chart showing an operation of the wireless receiver apparatus, FIG. 4 is a block diagram showing a configuration of a local oscillator 10 shown in FIG. 1, and FIG. 5 is a block diagram showing a configuration of a mixer 6 shown in FIG. 1.

Referring to FIG. 1, the wireless receiver apparatus is constituted by including an antenna 50, a front-end circuit 1, the integrated circuit 100 for wireless receiving, a controller 60, a reference resistor 70, a direct-current power source (referred to as a DC power source hereinafter) 51, and a clock signal generator 61. In this case, the integrated circuit 100 for wireless receiving includes a wireless receiver circuit 20, a constant voltage source 8, a bias current detector circuit 3, a current controller circuit 4, a memory circuit 2, and a counter circuit 13, and the integrated circuit 100 is configured as one semiconductor integrated circuit constituted by an IC or an LSI. In addition, the wireless receiver circuit 20 is constituted by including a high frequency amplifier 5 including a bias current control circuit 5a, a mixer 6 including a bias current control circuit 6a, an intermediate frequency circuit 7 including a bias current control circuit 7a, a local oscillator 10 including a bias current control circuit 10a, a frequency divider 11 including a bias current control circuit 11a, a phase locked loop (referred to as a PLL hereinafter) circuit 12 including a bias current control circuit 12a, and a buffer circuit 9 including a bias current control circuit 9a. Configurations of the bias current detector circuit 3, the local oscillator 10, and the mixer 6 will be described later in detail with reference to FIGS. 2, 4, and 5, respectively.

In this case, the wireless receiver circuit shown in FIG. 1 is characterized by including the semiconductor integrated circuit 100 for wireless receiving including the wireless receiver circuit 20, that converts a wireless received signal which is received via the antenna 50 and has a predetermined wireless frequency, into an intermediate frequency signal and that outputs the intermediate frequency signal. The semiconductor integrated circuit 100 for wireless receiving is also characterized by including the constant voltage source 8 which supplies a bias current to the wireless receiver circuit 20, the bias current detector circuit 3 which detects the bias current and outputs a first detection signal Sd0 and a second detection signal Si0 indicating a detection result, the memory circuit 2 which stores the detection result, and the current controller circuit 4. After controlling the bias current detector circuit 3 to stop operating thereof, the current controller circuit 4 performs a control process for controlling the bias current to decrease when the detected bias current is larger than a predetermined first threshold value, and for controlling the bias current to increase when the detected bias current is smaller than a second threshold value smaller than the first threshold value, based on the detection result stored in the memory circuit 2.

The wireless receiver apparatus shown in FIG. 1 is driven by the DC power source 51 outputting an output voltage Vp. In addition, in the wireless receiver apparatus shown in FIG. 1, the controller 60 is provided for controlling overall operation performed by the wireless receiver apparatus and operation performed by the integrated circuit 100 for wireless receiving. Further, the clock signal generator 61 generates a clock signal CLK having a pulse shape which is generated so as to be periodically repeated in a predetermined period, and outputs the clock signal CLK to the PLL circuit 12 and the counter circuit 13 of the integrated circuit 100 for wireless receiving.

Referring to FIG. 1, the reference resistor 70 is arranged outside of the integrated circuit 100 for wireless receiving and has a predetermined resistance value Rref. The reference resistor 70 has an accuracy higher than those of the resistors 71 to 73 (See FIG. 2) formed in the bias current detector circuit 3 of the integrated circuit 100 for wireless receiving. In addition, the resistance value of the reference resistor 70 has a smaller variation caused by the variation in its manufacturing process, and change in the resistance value of the reference resistor 70 due to the change in temperature is smaller, as compared with the resistors 71 to 73, as will be described later in detail. As shown in FIG. 2, one end of the reference resistor 70 is connected to a collector of a pnp transistor Q2 of the bias current detector circuit 3, and another end of the reference resistor 70 is grounded.

In addition, referring to FIG. 1, the front-end circuit 1 is connected to the antenna 50, includes an impedance matching circuit for matching an impedance of the antenna 50 to an input impedance of the integrated circuit 100 for wireless receiving and a high frequency band-pass filter for performing a band-pass filtering process on the wireless received signal received by the antenna 50 to pass therethrough a signal having a predetermined frequency, and outputs the processed wireless received signal to the high frequency amplifier 5. The high frequency amplifier 5 includes an automatic gain control function of automatically controlling a gain thereof so that the level of the output signal therefrom is substantially equal to a predetermined value, amplifiers the inputted wireless received signal to have the level equal to the predetermined value, and outputs a resultant signal to the mixer 6.

On the other hand, as will be described later in detail with reference to FIG. 4, the local oscillator 10 of a voltage control oscillator includes a varactor diode C32. By applying a predetermined reverse bias voltage to the varactor diode C32 from the PLL circuit 12, the local oscillator 10 generates a local oscillation signal having a predetermined frequency, and outputs the local oscillation signal to the frequency divider 11. The frequency divider 11 is controlled by the controller 60 to divide the local oscillation signal from the local oscillator 10 by a predetermined frequency division rate "N" and to output a resultant signal to the PLL circuit 12. Further, the PLL circuit 12 detects a phase difference between the signal from the frequency divider 11a and the clock signal CLK from the clock signal generator 61, generates the reverse bias voltage based on the detected phase difference, and applies the reverse bias voltage to the varactor diode C32 (See FIG. 4) of the local oscillator 10. Accordingly, the local oscillator 10 generates the local oscillation signal having a frequency "N" times as high as the frequency of the clock signal CLK, and outputs the local oscillation signal to the buffer circuit 9. The buffer circuit 9 converts the signal level of the inputted local oscillation signal into a predetermined signal level, and outputs a resultant signal to the mixer 6.

The mixer 6 mixes the wireless received signal from the high frequency amplifier 5 with the local oscillation signal from the buffer circuit 9, and outputs a resultant signal to the intermediate frequency circuit 7. Further, the intermediate frequency circuit 7 eliminates the signal components other than the intermediate frequency signal from the inputted signal, amplifies the intermediate frequency signal after the elimination to output the same to a video and audio signal processing circuit (not shown) provided at the subsequent stage of the integrated circuit 100 for wireless receiving.

Referring to FIG. 1, the counter circuit 13 is a counting device for generating a mode switching signal S1 indicating a predetermined time interval, and outputting the mode switching signal S1 to the current controller circuit 4. In this case, the counter circuit 13 starts counting pulses of the clock signal CLK from the clock signal generator 61 at a timing of a rising edge of a control start signal So from the controller 60, generates the mode switching signal S1 having a high level, and outputs the mode switching signal S1 having the high level to the current controller circuit 4. When a count value is equal to, for example, a predetermined count value "10", the counter circuit 13 generates the mode switching signal S1 having a low level, and outputs the mode switching signal S1 having the low level to the current controller circuit 4.

In addition, referring to FIG. 1, the current controller circuit 4 is a control logic circuit and has a bias current detection mode and a receiving mode. In response to the mode switching signal S1 having the high level, the current controller circuit 4 is set to the current detection mode, generates a mode switching signal S2 having the high level, outputs the mode switching signal S2 having the high level to the constant voltage source 8 so as to control the bias current detection circuit 3 to operate, and outputs the first detection signal Sd0 and the second detection signal Si0 indicating the detection result of the bias current to the memory circuit 2 of a latch circuit. On the other hand, in response to the mode switching signal S1 having the low level, the current controller circuit 4 is set to the receiving mode, generates the mode switching signal S2 having the low level, and outputs the mode switching signal S2 having the low level to the constant voltage source 8 so as to control the bias current detection circuit 3 to stop operating thereof. And thereafter, the current controller circuit 4 reads out the first detection signal Sd0 and the second detection signal Si0 from the memory circuit 2, and outputs them to each of the bias current control circuits 5a, 6a, 7a, 9a, 10a, and 11a as a first bias current control signal Sd and a second bias control signal Si, respectively.

Further, referring to FIG. 1, the constant voltage source 8 converts the output voltage Vp from the DC power source 51 into a constant voltage Vcc, and outputs the constant voltage Vcc to the bias current control circuits 5a, 6a, 7a, 9a, 10a, and 11a of the high frequency amplifier 5, the mixer 6, the intermediate frequency circuit 7, the buffer circuit 9, the local oscillator 10, the frequency divider 11, and the PLL circuit 12, respectively, so as to supply the bias current to each of the high frequency amplifier 5, the mixer 6, the intermediate frequency circuit 7, the buffer circuit 9, the local oscillator 10, the frequency divider 11, and the PLL circuit 12. The constant voltage source 8 generates a mode switching signal S3 having the high level in response to the mode switching signal S2 having the high level from the current controller circuit 4, and outputs the mode switching signal S3 having the high level to the bias current detector circuit 3. Further, the constant voltage source 8 generates the mode switching signal S3 having the low level in response to the mode switching signal S2 having the low level from the current controller circuit 4, and outputs the mode switching signal S3 having the low level to the bias current detector circuit 3.

Referring to FIG. 2, the bias current detector circuit 3 is constituted by including pnp transistors Q1 to Q4, an npn transistor Q5, the resistor 71 having a nominal resistance value R1, the resistor 72 having a nominal resistance value R2, the resistor 73 having a nominal resistance value R3, and comparators 21 and 22. In this case, an emitter of the npn transistor Q5 is grounded via the resistor 71, and a collector of the npn transistor Q5 is connected to a collector of the pnp transistor Q1. Further, the collector of the pnp transistor Q1 is connected to bases of the pnp transistors Q1 to Q4, and an emitter of the pnp transistor Q1 is connected to a power source terminal 23 for outputting the output voltage Vp from the DC power source 51. In addition, an emitter of the pnp transistor Q2 is connected to the power source terminal 23, and a collector of the pnp transistor Q2 is grounded via the resistor 70 and connected to an inverting input terminal of the comparator 22 and to a non-inverting input terminal of the comparator 21. Further, an emitter of the pnp transistor Q3 is connected to the power source terminal 23, and a collector of the pnp transistor Q3 is grounded via the resistor 72 and connected to an inverting input terminal of the comparator 21. Still further, an emitter of the pnp transistor Q4 is connected to the power source terminal 23, and a collector of the pnp transistor Q4 is grounded via the resistor 73 and connected to a non-inverting input terminal of the comparator 22. In this case, the pnp transistors Q1 to Q4 constitute a current mirror circuit. In addition, the mode switching signal S3 from the constant voltage source 8 is outputted to a base of the npn transistor Q5.

In the bias current detector circuit 3, the comparator 21 generates the second detection signal Si0 having the high level when its non-inverting input terminal is higher in voltage level than its inverting input terminal, and outputs the second detection signal Si0 having the high level to the current controller circuit 4. In addition, the comparator 21 generates the second detection signal Si0 having the low level when its non-inverting input terminal is equal to or lower in voltage level than its inverting input terminal, and outputs the second detection signal Si0 having the low level to the current controller circuit 4. Further, the comparator 22 generates the first detection signal Sd0 having the high level when its non-inverting input terminal is higher in voltage level than its inverting input terminal, and outputs the first detection signal Sd0 having the high level to the current controller circuit 4. Still further, the comparator 22 generates the first detection signal Sd0 having the low level when its non-inverting input terminal is equal to or lower in voltage level than its inverting input terminal, and outputs the first detection signal Sd0 having the low level to the current controller circuit 4.

Referring to FIG. 2, the npn transistor Q5 of the bias current detector circuit 3 is turned off in response to the mode switching signal S3 having the low level from the constant voltage source 8. Accordingly, the pnp transistors Q1 to Q4 are turned off, and no current flows through the bias current detector circuit 3.

On the other hand, the npn transistor Q5 is turned on in response to the mode switching signal S3 having the high level from the constant voltage source 8. In this case, a collector current value I1 of the npn transistor Q5 is represented by the following Equation (1):

$$I1 = Ve/R1 \quad (1),$$

where Ve indicates an emitter current value of the npn transistor Q5.

Accordingly, a collector current of each of the pnp transistors Q1 to Q4 has the current value I1. In this case, collector voltage values V1, V2, and V3 of the pnp transistors Q2 to Q4 are represented by the following Equations (2) to (4), respectively:

$$V1 = I1 \times Rref = Ve \times Rref/R1 \quad (2),$$

$$V2 = I1 \times R2 = Ve \times R2/R1 \quad (3), \text{ and}$$

$$V3 = I1 \times R3 = Ve \times R3/R1 \quad (4).$$

In this case, the resistors 71 to 73 are formed on the same substrate in the same semiconductor integrated circuit by the same manufacturing process. Accordingly, difference between the resistance value of the resistor 71 and the nominal resistance value R1, difference between the resistance value of the resistor 72 and the nominal resistance value R2, and difference between the resistance value of the resistor 73 and the nominal resistance value R3 are substantially identical to each other, since the differences are caused by the variation in the manufacturing process. In addition, temperature characteristics of the respective resistors 71 to 73 are substantially identical to each other. Namely, if the resistance value of the resistor 71 is larger by, for example, 10% than the nominal resistance value R1, then the resistance value of the resistor 72 is larger by 10% than the nominal resistance value R2 and the resistance value of the resistor 73 is larger by 10% than the nominal resistance value R3.

The resistance value Rref and the nominal resistance value R2 and R3 are set to satisfy the following Equation (5):

$$\begin{aligned} Rref &= R3(1 + \Delta r/100) \\ &= R2(1 - \Delta r/100) \end{aligned} \quad (5),$$

where $\Delta r(\%)$ indicates a threshold value of an absolute value of differences between the resistance values of the resistors 71 to 73 and the nominal resistance values R1 to R3.

Namely, a relationship of R3<Rref<R2 holds.

Accordingly, when the resistors 71 to 73 have resistance values within the threshold value $\Delta r$ (%) with respect to the nominal resistance values R1 to R3, respectively, and the resistance value of the reference resistor 70 is substantially equal to the resistance value Rref, the collector voltage values V1, V2, and V3 of the respective npn transistors Q2 to Q4 satisfy the following Equation (6):

$$V3 < V1 < V2 \quad (6).$$

In this case, the bias current detector circuit 3 generates the first detection signal Sd0 having the low level and the second detection signal Si0 having the low level, and outputs the first detection signal Sd0 having the low level and the second detection signal Si0 having the low level to the current controller circuit 4.

As mentioned above, the difference between the nominal resistance value R1 and the resistance value of the resistor 71, the difference between the nominal resistance value R2 and the resistance value of the resistor 72, and the difference between the nominal resistance value R3 and the resistance value of the resistor 73 are substantially identical to each other, and the temperature characteristics of the resistors 71 to 73 are substantially identical to each other. Due to this, in the collector voltage value V2 of the transistor Q3 expressed by the Equation (3), the difference between the nominal resistance values R1 and the resistance value of the resistor 71 and the difference between the nominal resistance values R2 and the resistance value of the resistor 72 is cancelled out. In addition, in the collector voltage value V3 of the transistor Q4 expressed by the Equation (4), the difference between the nominal resistance values R1 and the resistance value of the resistor 71 and the difference between the nominal resistance values R3 and the resistance value of the resistor 73 is cancelled out. On the other hand, the reference resistor 70 is arranged outside of the integrated circuit 100 for wireless receiving, has an accuracy higher than those of the resistors 71 to 73, and the variation of the resistance value Rref of the reference resistor 70 is negligibly small as compared with the variations of the resistance values of the respective resistors 71 to 73 formed in the integrated circuit 100 for wireless receiving with respect to the nominal resistance values R1 to R3.

Accordingly, when the resistance values of the resistors 71 to 73 are larger than the nominal resistance values R1 to R3 and absolute values of the differences (%) between the resistance values of the resistors 71 to 73 and the nominal resistance values R1 to R3 are larger than the threshold value Δr, respectively, the resistance value of the resistor 73 is larger than the resistance value Rref. Due to this, the collector voltage values V1, V2, and V3 of the pnp transistors Q2 to Q4 satisfy the following Equation (7):

$$V1 < V3 < V2 \qquad (7).$$

In this case, the bias current detector circuit 3 generates the first detection signal Sd0 having the low level and the second detection signal Si0 having the high level, and outputs the first detection signal Sd0 having the low level and the second detection signal Si0 having the high level to the current controller circuit 4.

Further, when the resistance values of the resistors 71 to 73 are smaller than the nominal resistance values R1 to R3 and the absolute values of the differences (%) between the resistance values of the resistors 71 to 73 and the nominal resistance values R1 to R3 are larger than the threshold value Δr, respectively, the resistance value of the resistor 72 is smaller than the resistance value Rref. Due to this, the collector voltage values V1, V2, and V3 of the pnp transistors Q2 to Q4 satisfy the following Equation (8):

$$V3 < V2 < V1 \qquad (8).$$

In this case, the bias current detector circuit 3 generates the first detection signal Sd0 having the high level and the second detection signal Si0 having the low level, and outputs the first detection signal Sd0 having the high level and the second detection signal Si0 having the low level to the current controller circuit 4.

In this case, the integrated circuit 100 for wireless receiving is constituted as one semiconductor integrated circuit. Due to this, the differences (%) between the resistance values of the resistors 71 to 73 and the nominal resistance values R1 to R3 are substantially identical to differences between resistance values of resistors (e.g., resistors 81 to 84 shown in FIG. 4 and resistors 91 to 96 shown in FIG. 5 to be described later in detail) formed on the substrate of the wireless receiver circuit 20 of the integrated circuit 100 for wireless receiving and the respective nominal resistance values thereof. Accordingly, as described in detail so far, by detecting whether or not the resistance value of the resistor 72 is larger than the nominal resistance value R2 and whether or not a magnitude (%) of the difference between the resistance value of the resistor 72 and the nominal resistance value R2 is larger than the predetermined threshold value Δr, the bias current detector circuit 3 detects whether or not the bias current supplied to the wireless receiver circuit 20 from the constant voltage source 8 is larger than the predetermined first threshold value, generates the first detection signal Sd0 indicating the detection result, and outputs the first detection signal Sd0 to the current controller circuit 4. Further, by detecting whether or not the resistance value of the resistor 73 is larger than the nominal resistance value R3 and whether not a magnitude (%) of the difference between the resistance value of the resistor 73 and the nominal resistance value R3 is larger than the predetermined threshold value Δr, the bias current detector circuit 3 detects whether not the bias current supplied to the wireless receiver circuit 20 from the constant voltage source 8 is smaller than the predetermined second threshold value smaller than the first threshold value, generates the second detection signal Si0 indicating the detection result, and outputs the second detection signal Si0 to the current controller circuit 4. Namely, the bias current detector circuit 3 converts the output voltage Vcc of the constant voltage source 8 of the bias current supply device into the constant current I1, and supplies the constant current I1 to the resistors 72 and 73 representing the resistors formed in the wireless receiver circuit 20 and the reference resistor 70. Further, the bias current detector circuit 3 compares the induced voltages V2 and V3 across the resistors 72 and 73 with the induced voltage V1 across the reference resistor 70, respectively, so as to detect whether or not the bias currents flowing through the circuits 5, 6, 7, 9, 10, 11, and 12 of the wireless receiver circuit 20 are larger than the predetermined first threshold value and smaller than the predetermined second threshold value, without directly detecting the bias currents flowing through the circuits 5, 6, 7, 9, 10, 11, and 12 of the wireless receiver circuit 20. Accordingly, the integrated circuit 100 for wireless receiving can be made simple as compared with the prior arts.

As stated so far in detail with reference to FIG. 2, the bias current detector circuit 3 includes the pnp transistor Q3 of a first current source, the pnp transistor Q4 of a second current source, and the pnp transistor Q2 of a third current source each of which supplies the predetermined identical constant current I1 (See the Equation (1)), the resistor 72 provided in the integrated circuit 100 for wireless receiving, connected to the collector of the pnp transistor Q3, and having the predetermined nominal resistance value R2, and the resistor 73 provided in the integrated circuit 100 for wireless receiving, connected to the collector of the pnp transistor Q4, and having the predetermined nominal resistance value R3. In this case, the collector of the pnp transistor Q2 is connected to the reference resistor 70. In addition, the reference resistor 70 is provided outside of the integrated circuit 100 for wireless receiving, has the predetermined reference resistance value Rref larger than the nominal resistance value R3 and smaller than the nominal resistance value R2, and has an accuracy higher than those of the resistors 72 and 73. The bias current detector circuit 3 detects the bias current flowing through the wireless receiver circuit 20 based on a result of comparison of the induced voltage V1 across the reference resistor 70 with the voltage V2 applied to the resistor 72, and on a result of comparison of the induced voltage V1 across to the reference resistor 70 with the voltage V3 applied to the resistor 73. Accordingly, it is possible to detect the bias current flowing through the wireless receiver circuit 20 with a simpler circuit configuration than those of the prior arts.

The operation of the wireless receiver apparatus shown in FIG. 1 will next be described with reference to FIG. 3. Referring to FIG. 3, after a power of the wireless receiver apparatus shown in FIG. 1 is turned on at a timing t1, the controller 60 generates the control start signal So having the high level and outputs the control start signal So having the high level to the counter circuit 13. In response to the control start signal So having the high level, the counter circuit 13 starts counting pulses of the clock signal CLK and also generates the switching signal S1 having the high level and outputs the switching signal S1 having the high level to the current controller circuit 4. Further, in response to the mode switching signal S1 having the high level, the current controller circuit 4 is set to the current detection mode, generates the mode switching signal S2 having the high level and outputs the mode switching signal S2 having the high level to the constant voltage source 8, and starts outputting the first detection signal Sd0 and the second detection signal Si0 from the bias current detector circuit 3 to the memory circuit 20. Still further, in response to the mode switching signal S2 having the high level, the constant voltage source 8 generates the mode switching signal S3 having the high level and outputs the mode switching signal S3 having the high level to the bias current detector circuit 3. In response to the mode switching signal S3 having the high level, the bias current detector circuit 3 detects the bias current supplied to the wireless receiver circuit 20 from the constant current source 8, generates the first detection signal Sd0 and the second detection signal Si0 indicating the detection result, and outputs the first detection signal Sd0 and the second detection signal Si0 to the current controller circuit 4.

When detecting that the count value is equal to the predetermined count value "10" at a timing t2, the counter circuit 13 generates the mode switching signal S1 having the low level and outputs the mode switching signal S1 having the low level to the current controller circuit 4. In response to the mode switching signal S1 having the low level, the current controller circuit 4 is set to the receiving mode, generates the mode switching signal S2 having the low level, and outputs the mode switching signal S2 having the low level to the constant voltage source 8. Further, the current controller circuit 4 reads out the first detection signal Sd0 and the second detection signal Si0 from the memory circuit 2, and outputs the first detection signal Sd0 and the second detection signal Si0 to each of the bias current control circuits 5a, 6a, 7a, 9a, 10a, and 11a as the first bias current control signal Sd and the second bias current control signal Si, respectively. Further, in response to the mode switching signal S2 having the low level, the constant voltage source 8 generates the mode switching signal S3 having the low level, and outputs the mode switching signal S3 having the low level to the bias current detector circuit 3. In response to the mode switching signal S3 having the low level, the bias current detector circuit 3 finishes detecting the bias current.

As will be described later in detail, during a time period of the receiving mode after the timing t2, in response to the first bias control signal Sd having the high level, the bias current control circuits 5a, 6a, 7a, 9a, 10a, 11a, and 12a reduce the bias currents flowing through the high frequency amplifier 5, the mixer 6, the intermediate frequency circuit 7, the buffer circuit 9, the local oscillator 10, the frequency divider 11, and the PLL circuit 12, respectively. On the other hand, in response to the second bias control signal Si having the high level, the bias current control circuits 5a, 6a, 7a, 9a, 10a, 11a, and 12a increase the bias currents flowing through the high frequency amplifier 5, the mixer 6, the intermediate frequency circuit 7, the buffer circuit 9, the local oscillator 10, the frequency divider 11, and the PLL circuit 12, respectively.

Referring to FIG. 4, the configuration and operation of the local oscillator 10 will next be described. Referring to FIG. 4, the local oscillator 10 is constituted by including a local oscillator circuit 101 and the bias current control circuit 10a.

In this case, the local oscillator circuit 101 is constituted by including inductors L31 and L32, a capacitor C31, the varactor diode C32, npn transistors Q31 and Q32, and high frequency blocking inductors L33 and L34. One end of the inductor L31 is connected to one end of the inductor L32 via the power source terminal 23, and another end of the inductor L31 is connected to one electrode of the capacitor C31. Further, another electrode of the capacitor C31 is connected to another end of the inductor L32. In addition, the anode of the varactor diode C32 is connected to a connection point between another end of the inductor L31 and one electrode of the capacitor C31, and the cathode of the varactor diode C32 is connected to a connection point between another end of the inductor L32 and another electrode of the capacitor C31. A base of the npn transistor Q31 is connected to a collector of the npn transistor Q32, and a collector of the npn transistor Q31 is connected to a connection point between the anode of the varactor diode C32 and one electrode of the capacitor C31, and the collector of the npn transistor Q31 is also connected to a base of the npn transistor Q32. An emitter of the npn transistor Q31 is connected to an emitter of the npn transistor Q32. Further, the collector of the npn transistor Q32 is connected to a connection point between the cathode of the varactor diode C32 and another electrode of the capacitor C31. The anode of the varactor diode C32 is connected to an input terminal 38 via the high frequency blocking inductor L34, and the cathode of the varactor diode C32 is connected to an input terminal 37 via the high frequency blocking inductor L33. In addition, a connection point between another end of the inductor L32 and another electrode of the capacitor C31 is connected to an output terminal 34. The collector of the npn transistor Q31 is connected to an output terminal 35. In this case, a predetermined reverse bias voltage from the PLL circuit 12 is applied to the varactor diode C32 via the input terminals 34 and 35. The bias current control circuit 10a supplies the bias current to the local oscillator circuit 101 configured as stated above, as will be described later in detail. The local oscillator circuit 101 generates the local oscillation signal having the predetermined frequency in response to the predetermined reverse bias voltage from the PLL circuit 12, and outputs the local oscillation signal to the buffer circuit 9 and the frequency divider 11 via the output terminals 34 and 35.

The bias current control circuit 10a is constituted by including an N channel MOS field effect transistor M31 and a P channel MOS field effect transistor M32 which constitute an inverter circuit, N channel MOS field effect transistors M33 and M34, resistors 81 to 84 having resistance values R81 to R84, respectively, and npn transistors Q33 to Q36. An input terminal of the inverter circuit constituted by the N channel MOS field effect transistor M31 and the P channel MOS field effect transistor M32 is connected to the input terminal 32, and an output terminal of the inverter circuit is connected to a gate of the N channel MOS field effect transistor M33. In addition, collectors of the npn transistors Q33, Q34, and Q35 are connected to a connection point between an emitter of the npn transistor Q31 and an emitter of the npn transistor Q32. Further, an emitter of the npn transistor Q33 is connected to a drain of the N channel MOS field effect transistor M33 via the emitter resistor 81, and a source of the N channel MOS field effect transistor M33 is grounded. An emitter of the npn transistor Q34 is connected to a drain of the N channel MOS field effect transistor M34 via the emitter resistor 82, a source of the N channel MOS field effect transistor M34 is grounded, and a gate of the N channel MOS field effect transistor M34 is connected to the input terminal 33. Further, an emitter of the npn transistor Q35 is grounded via the emitter resistor 83. A collector of the npn transistor Q36 is connected to the constant voltage source 8 outputting the constant voltage Vcc via the input terminal 36, and an emitter of the npn transistor Q36 is grounded via the emitter resistor 84. In addition, bases of the respective npn transistors Q33 to Q36 and the collector of the npn transistor Q36 are connected to one another. In this case, the first bias current control signal Sd from the current controller circuit 4 is outputted to the inverter circuit constituted by the N channel MOS field effect transistor M31 and the P channel MOS field effect transistor M32 via the input terminal 32. The second bias control signal Si from the current controller circuit 4 is outputted to the gate of the N channel MOS field effect transistor M34.

Referring to FIG. 4, when the current value of the bias current supplied to the wireless receiver circuit 20 from the constant voltage source 8 is equal to or larger than the second threshold value and equal to or smaller than the first threshold value, the N channel MOS field effect transistor M33 is turned on in response to the first bias current control signal Sd having the low level, and the N channel MOS field effect transistor M34 is turned off in response to the second bias current control signal Si having the low level. Accordingly, the bias current, which is a sum of collector currents flowing through the respective npn transistors Q33 and Q36, flows through the local oscillator circuit 101. In addition, when the current value of the bias current supplied to the wireless receiver circuit 20 from the constant voltage source 8 is smaller than the first threshold value, the N channel MOS field effect transistor M33 is turned on in response to the first bias current control signal Sd having the low level, and the N channel MOS field effect transistor M34 is turned on in response to the second bias current control signal Si having the high level. Accordingly, the bias current, which is a sum of collector currents flowing through the respective npn transistors Q33, Q34, and Q35, flows through the local oscillator circuit 101. Further, when the current value of the bias current supplied to the wireless receiver circuit 20 from the constant voltage source 8 is larger than the second threshold value, the N channel MOS field effect transistor M33 is turned off in response to the first bias current control signal Sd having the high level, and the N channel MOS field effect transistor M34 is turned off in response to the second bias current control signal Si having the low level. Accordingly, the collector current flowing through the npn transistor Q33 flows through the local oscillator circuit 101 as the bias current.

As described so far in detail, in the local oscillator 10 configured as shown in FIG. 4, when the current value of the bias current supplied to the wireless receiver circuit 20 from the constant voltage source 8 is smaller than the second threshold value, the bias current flowing through the local oscillator circuit is increased, as compared with the bias current flowing through the local oscillator circuit 101 when the current value of the bias current supplied to the wireless receiver circuit 20 from the constant voltage source 8 is equal to or larger than the second threshold value and equal to or smaller than the first threshold value. On the other hand, when the current value of the bias current supplied to the wireless receiver circuit 20 from the constant voltage source 8 is larger than the first threshold value, the bias current flowing through the local oscillator circuit is decreased, as compared with the bias current flowing through the local oscillator circuit 101 when the current value of the bias current supplied to the wireless receiver circuit 20 from the constant voltage source 8 is equal to or larger than the second threshold value and equal to or smaller than the first threshold value.

The current value of the bias current flowing through the local oscillator circuit 101 when the current value of the bias current supplied to the wireless receiver circuit 20 from the constant voltage source 8 is smaller than the second threshold value is increased by as much as the current value of the collector current flowing through the npn transistor Q34, as compared with the bias current flowing through the local oscillator circuit 101 when the current value of the bias current supplied to the wireless receiver circuit 20 from the constant voltage source 8 is equal to or larger than the second threshold value and equal to or smaller than the first threshold value. This increase is set so that oscillation stop does not occur to the local oscillator circuit 101.

Referring to FIG. 5, the configuration and operation of the mixer 6 will next be described. Referring to FIG. 5, the mixer 6 is constituted by including a mixer circuit 62 and the bias current control circuit 6a.

Referring to FIG. 5, the mixer circuit 62 is constituted by including npn transistors Q41 to Q46 and a resistor 95. In this case, a base of the npn transistor Q41 is connected to an input terminal 46 and connected to a base of the npn transistor Q44. In addition, a collector of the npn transistor Q41 is connected to an output terminal 41 and connected to a collector of the npn transistor Q43. An emitter of the npn transistor Q41 is connected to an emitter of the npn transistor Q42. Further, a collector of the npn transistor Q44 is connected to an output terminal 42 and connected to a collector of the npn transistor Q42. Still further, an emitter of the npn transistor Q44 is connected to an emitter of the npn transistor Q43. Further, bases of the respective npn transistors Q42 and Q43 are connected to an input terminal 47. Still further, a collector of the npn transistor Q45 is connected to emitters of the respective npn transistors Q41 and Q42, and a base of the npn transistor Q45 is connected to an input terminal 43. In addition, a collector of the npn transistor Q46 is connected to emitters of the respective npn transistors Q43 and Q44, and a base of the npn transistor Q46 is connected to an input terminal 44. Further, the resistor 95 is connected between emitters of the respective npn transistors Q45 and Q46. The bias current is supplied by the bias current control circuit 6a to the mixer circuit 62 configured as stated above, as will be described later in detail. In the mixer circuit 62, the wireless received signal inputted from the high frequency circuit 5 via the input terminals 43 and 44 is mixed with the local oscillation signal inputted from the buffer circuit 9 via the input terminals 46 and 47, and the resultant signal is outputted to the intermediate frequency circuit 7 via the output terminals 41 and 42.

In addition, referring to FIG. 5, the bias current control circuit 6a is constituted by including an N channel MOS field effect transistor M41 and a P channel MOS field effect transistor M42 which constitute an inverter circuit, N channel MOS field effect transistors M43 and M44, emitter resistors 91 to 94 having resistance values R91 to R94, respectively, an emitter resistor 96 having a resistance value R96, and npn transistors Q47 to Q49. In this case, an input terminal of the inverter circuit constituted by the N channel MOS field effect transistor M41 and the P channel MOS field effect transistor M42 is connected to an input terminal 33a, and an output terminal of the inverter circuit is connected to a gate of the N channel MOS field effect transistor M43. In addition, a collector of the npn transistor Q47 is connected to the constant voltage source 8 outputting the constant voltage Vcc via the input terminal 36a, and to bases of the respective npn transistors Q47 to Q49. Further, an emitter of the npn transistor Q47 is grounded via the resistor 93, connected to a drain of the N channel MOS field effect transistor M43 via the resistor 91, and connected to a drain of the N channel MOS field effect transistor M44 via the resistor 92. Further, a source of the N channel MOS field effect transistor M43 is grounded. Still further, a gate of the N channel MOS field effect transistor M44 is connected to the input terminal 32a, and a source of the N channel MOS field effect transistor M44 is grounded. In addition, a collector of the npn transistor Q48 is connected to an emitter of the npn transistor Q45, and an emitter of the npn transistor Q48 is grounded via the resistor 94. Further, a collector of the npn transistor Q49 is connected to an emitter of the npn transistor Q46, and an emitter of the npn transistor Q49 is grounded via the resistor 96. In this case, the second bias current control signal Si from the current controller circuit 4 is outputted to the inverter circuit constituted by the N channel MOS field effect transistor M41 and the P channel MOS field effect transistor M42, via the input terminal 33a. On the other hand, the first bias current control signal Sd from the current controller circuit 4 is outputted to the gate of the N channel MOS field effect transistor M44 via the input terminal 32a.

Referring to FIG. 5, when the current value of the bias current supplied to the wireless receiver circuit 20 from the constant voltage source 8 is equal to or larger than the second threshold value and equal to or smaller than the first threshold value, the N channel MOS field effect transistor M44 is turned off in response to the first bias control signal Sd having the low level, and the N channel MOS field effect transistor M43 is turned on in response to the second bias current control signal Si having the low level. Accordingly, a current value Ic48 of a collector current flowing through the npn transistor Q48 and a current value Ic49 of a collector current flowing through the npn transistor Q49 are expressed by the following Equations (9) and (10), respectively:

$$Ic48 = A \times R91 \times R93 / \{(R91+R93) \times R94\} \quad (9), \text{ and}$$

$$Ic49 = B \times R91 \times R93 / \{(R91+R93) \times R96\} \quad (10),$$

where A and B are positive constants.

In addition, when the current value of the bias current supplied to the wireless receiver circuit 20 from the constant voltage source 8 is smaller than the second threshold value, the N channel MOS field effect transistor M44 is turned off in response to the first bias control signal Sd having the low level, and the N channel MOS field effect transistor M43 is turned off in response to the second bias current control signal Si having the high level. Accordingly, the current value Ic48 of the collector current flowing through the npn transistor Q48 and the current value Ic49 of the collector current flowing through the npn transistor Q49 are expressed by the following Equations (11) and (12), respectively:

$$Ic48 = A \times R93 / R94 \quad (11), \text{ and}$$

$$Ic49 = B \times R93 / R96 \quad (12).$$

Further, when the current value of the bias current supplied to the wireless receiver circuit 20 from the constant voltage source 8 is larger than the first threshold value, the N channel MOS field effect transistor M44 is turned on in response to the first bias control signal Sd having the high level, and the N channel MOS field effect transistor M43 is turned on in response to the second bias current control signal Si having the low level. Accordingly, the current value Ic48 of the collector current flowing through the npn transistor Q48 and the current value Ic49 of the collector current flowing through the npn transistor Q49 are expressed by the following Equations (13) and (14), respectively:

$$Ic48 = A \times R91 \times R92 \times R93 / \{(R91 \times R92 + R92 \times R93 + R93 \times R91) \times R94\} \quad (13), \text{ and}$$

$$Ic49 = B \times R91 \times R92 \times R93 / \{(R91 \times R92 + R92 \times R93 + R93 \times R91) \times R96\} \quad (14).$$

As stated above in detail, in the mixer 6 configured as shown in FIG. 5, the bias current flowing through the mixer 6 is increased, when the current value of the bias current supplied to the wireless receiver circuit 20 from the constant voltage source 8 is smaller than the second threshold value, as compared with the bias current flowing through the mixer 6 when the current value of the bias current supplied to the wireless receiver circuit 20 from the constant voltage source 8 is equal to or larger than the second threshold value and equal to or smaller than the first threshold value. On the other hand, the bias current flowing through the mixer 6 is reduced, when the current value of the bias current supplied to the wireless receiver circuit 20 from the constant voltage source 8 is larger than the first threshold value, as compared with the bias current flowing through the mixer 6 when the current value of the bias current supplied to the wireless receiver circuit 20 from the constant voltage source 8 is equal to or larger than the second threshold value and equal to or smaller than the first threshold value.

The bias current control circuits 5a, 7a, 9a, 11a, and 12a are configured similarly to the bias current control circuit 10a shown in FIG. 4 or the bias current control circuit 6a shown in FIG. 5, respectively. In this case, the bias current control circuits 5a, 7a, 9a, 11a, and 12a control the bias currents flowing through the high frequency amplifier 5, the intermediate frequency circuit 7, the buffer circuit 9, the frequency divider 11, and the PLL circuit 12 to increase, respectively, when the current value of the bias current supplied to the wireless receiver circuit 20 from the constant voltage source 8 is smaller than the second threshold value, as compared with the bias current flowing through the wireless receiver circuit 20 from the constant voltage source 8 when the current value of the bias current supplied to the wireless receiver circuit 20 from the constant voltage source 8 is equal to or larger than the second threshold value and equal to or smaller than the first threshold value. On the other hand, the bias current control circuits 5a, 7a, 9a, 11a, and 12a control the bias currents flowing through the high frequency amplifier 5, the intermediate frequency circuit 7, the buffer circuit 9, the frequency divider 11, and the PLL circuit 12 to decrease, respectively, when the current value of the bias current supplied to the wireless receiver circuit 20 from the constant voltage source 8 is larger than the first threshold value, as compared with the bias current flowing through the wireless receiver circuit 20 from the constant voltage source 8 when the current value of the bias current supplied to the wireless receiver circuit 20 from the constant voltage source 8 is equal to or larger than the second threshold value and equal to or smaller than the first threshold value.

As stated so far in detail, the wireless receiver apparatus according to the present preferred embodiment includes the bias current detector circuit 3 for detecting the bias current supplied to the wireless receiver circuit 20 from the constant voltage source 8 and for outputting a detection result to the current controller circuit 4, and the current controller circuit 4. After outputting the detection result of the bias current to the memory circuit 2, the current controller circuit 4 performs a control process for controlling the bias current to decrease when the detected bias current is larger than the predetermined first threshold value and for controlling the bias current to increase when the detected bias current is smaller than the second threshold value smaller than the first threshold value, based on the detection result stored in the memory circuit 2. Accordingly, even if the current consumption has variation due to the variation in the manufacturing process for the integrated circuit 100 for wireless receiving, the power consumption is low as compared with the prior arts. Further, since the bias current detector circuit 3 does not operate during the control process, the current consumption is low as compared with the prior arts.

In addition, in the wireless receiver apparatus according to the present preferred embodiment, the bias current detector circuit 3 detects the bias current immediately after the power of the wireless receiver apparatus is turned on, and then stops operating. Accordingly, there is no influence on the receiving characteristics of the wireless received signal received by the wireless receiver circuit 20 subsequently.

Modified Preferred Embodiment

FIG. 6 is a block diagram showing a configuration of a wireless receiver apparatus including an integrated circuit 100A for wireless receiving according to a modified preferred embodiment of the preferred embodiment of the present invention. As shown in FIG. 6, the wireless receiver apparatus according to the modified preferred embodiment is characterized, as compared with the preferred embodiment, in that the counter circuit 13 is provided outside of the integrated circuit 100A for wireless receiving. Referring to FIG. 6, the wireless receiver apparatus according to the modified preferred embodiment is constituted by including the antenna 50, the front-end circuit 1, the integrated circuit 100A for wireless receiving, the controller 60, the reference resistor 70, the clock signal generator 61, and the counter circuit 13. Further, the integrated circuit 100A for wireless receiving includes the wireless receiver circuit 20, the constant voltage source 8, the bias current detector circuit 3, the current controller circuit 4, and the memory circuit 2, and the integrated circuit 100A is configured as one semiconductor integrated circuit constituted by an IC or an LSI.

In the preferred embodiment and the modified preferred embodiment of the preferred embodiment, the counter circuit 13 starts counting pulses of the clock signal CLK from the clock signal generator 61 at the timing of the rising edge of the control start signal So from the controller 60. In addition, the counter circuit 13 generates the mode switching signal S1 having the high level, and outputs the mode switching signal S1 having the high level to the current controller circuit 4. When the count value becomes equal to, for example, the predetermined count value "10", the counter circuit 13 generates the mode switching signal S1 having the low level and outputs the mode switching signal S1 having the low level to the current controller circuit 4. However, the present invention is limited to this. The predetermined count value may be a count value corresponding to a time interval required by the current controller circuit 4 to write the first detection signal Sd0 and the second detection signal Si0 from the bias current detector circuit 3 to the memory circuit 2. The predetermined count value is preferably a count value corresponding to a time interval equal to or longer than 0.5 milliseconds (msec) and equal to or shorter than 1 msec.

In the preferred embodiment and the modified preferred embodiment of the preferred embodiment, the controller 60 generates the control start signal So having the high level and outputs the control start signal So having the high level to the counter circuit 13 when the power of the wireless receiver apparatus shown in FIG. 1 is turned on. However, the present invention is not limited to this. The controller 60 may generate the control start signal So having the high level and output the control start signal So having the high level to the counter circuit 13 when the frequency of the wireless received signal received via the antenna 50 is changed, i.e., at a predetermined timing such as a timing at which the frequency division rate "N" of the frequency divider 11 is changed. Further, the controller 60 may generate the control start signal So having the high level and output the control start signal So having the high level to the counter circuit 13, based on at least one of a reset signal generated when the power of the wireless receiver circuit is turned on and a control signal generated when the frequency division rate "N" of the frequency divider 11 is changed and outputted to the frequency divider 11. Accordingly, when the bias current flowing through the wireless receiver circuit 20 is changed before and after the predetermined timing, due to a change in the surrounding temperature of the wireless receiver circuit 20 and/or a change in the output voltage Vcc from the constant voltage source 8, the bias current after the change can be detected and the bias current flowing through the wireless receiver circuit 20 can be controlled based on the detection result. Accordingly, it is possible to always reduce the current consumption of the wireless receiver apparatus as compared with the prior arts. In addition, the wireless receiver apparatus according to the prior art which controls the bias current detector circuit 3 to always operate has the following disadvantageous problem. Namely, when the surrounding temperature of the wireless receiver circuit 20 and/or the output voltage Vcc from the constant voltage source 8 fluctuate and and the voltage value V3 is closer to the voltage values V1 and V2, the bias current flowing through the wireless receiver circuit 20 is changed. As a result, the receiving characteristics of the wireless received signal received by the wireless receiver circuit 20 disadvantageously deteriorate. On the other hand, in the wireless receiver apparatus according to the present invention, the bias current flowing through the wireless receiver circuit 20 is detected and changed only at the predetermined timing, and therefore, the receiving characteristics of the wireless received signal received by the wireless receiver circuit 20 can be better than those according to the prior arts.

In the preferred embodiment and the modified preferred embodiment of the preferred embodiment, the bias current detector circuit 3 detects whether or not the bias current flowing through the wireless receiver circuit 20 is larger than the first threshold value and smaller than the second threshold value. However, the present invention is not limited to this. Alternatively, the bias current may be detected by setting three or more bias current threshold values, and the bias currents flowing through the high frequency amplifier 5, the mixer 6, the intermediate frequency circuit 7, the buffer circuit 9, the local oscillator 10, the frequency divider 11, and the PLL circuit 12 may be increased or reduced based on the detection result. In this case, the bias current detector circuit 3 may be constituted by including three or more circuits each having a configuration similar to that of a circuit including the pnp transistor Q3, the resistor 72, and the comparator 21 or a circuit including the pnp transistor Q4, the resistor 73, and the comparator 22.

INDUSTRIAL APPLICABILITY

According to the semiconductor circuit for wireless receiving and the wireless receiver apparatus including the semiconductor circuit for wireless receiving according to the present invention, after controlling the bias current detection device to stop operating thereof, the control device performs the control process for controlling the bias current. In the control process, the control device controls the bias current to decrease when the detected bias current is larger than the predetermined first threshold value, and controls the bias current to increase when the detected bias current is smaller than the second threshold value smaller than the first threshold value, based on the detection result stored in the storage device. Accordingly, the bias current detection device does not operate during the control process, and the current consumption of the semiconductor circuit for wireless receiving is smaller than that of the prior arts.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A semiconductor circuit for wireless receiving comprising a wireless receiver circuit for converting a wireless received signal having a predetermined radio frequency into an intermediate frequency signal, and outputting the intermediate frequency signal, said semiconductor circuit comprising:
    a bias current supply device for supplying a bias current to said wireless receiver circuit;
    a bias current detection device for detecting the bias current, and outputting a detection result;
    a storage device for storing the detection result; and
    a control device for, after controlling said bias current detection device to stop operating thereof, performing a control process for controlling the bias current to decrease when the detected bias current is larger than a predetermined first threshold value and for controlling the bias current to increase when the detected bias current is smaller than a second threshold value smaller than the first threshold value, based on the detection result stored in said storage device.

2. The semiconductor circuit for wireless receiving as claimed in claim 1,
    wherein said bias current detection device comprises:
    first, second and third current sources each supplying a predetermined identical constant current;
    a first resistor provided in said semiconductor circuit, connected to the first current source, and having a predetermined first nominal resistance value; and
    a second resistor provided in said semiconductor circuit, connected to the second current source, and having a predetermined second nominal resistance value smaller than the first nominal resistance value,
    wherein the third current source is connected to a reference resistor,
    wherein the reference resistor is provided outside of said semiconductor circuit, has a predetermined reference resistance value larger than the second nominal resistance value and smaller than the first nominal resistance value, and has an accuracy higher than those of the first resistor and the second resistor, and
    wherein said bias current detection device detects the bias current based on not only a result of comparison of an induced voltage across the reference resistor with an induced voltage across the first resistor, but also a result of comparison of the induced voltage across the reference resistor with an induced voltage across the second resistor.

3. The semiconductor circuit for wireless receiving as claimed in claim 2,
    wherein said control device performs the control process when a power of said wireless receiver circuit is turned on.

4. The semiconductor circuit for wireless receiving as claimed in claim 2,
    wherein said control device performs the control process when the radio frequency of the wireless received signal is changed.

5. The semiconductor circuit for wireless receiving as claimed in claim 2, further comprising a clock device for generating a mode switching signal indicating a predetermined time interval, and outputting the mode switching signal to said control device,
    wherein said control device controls said bias current detection device to operate for the time interval in response to the mode switching signal, and then, performs the control process.

6. The semiconductor circuit for wireless receiving as claimed in claim 1,
    wherein said control device performs the control process when a power of said wireless receiver circuit is turned on.

7. The semiconductor circuit for wireless receiving as claimed in claim 1,
    wherein said control device performs the control process when the radio frequency of the wireless received signal is changed.

8. The semiconductor circuit for wireless receiving as claimed in claim 1, further comprising a clock device for generating a mode switching signal indicating a predetermined time interval, and outputting the mode switching signal to said control device,
    wherein said control device controls said bias current detection device to operate for the time interval in response to the mode switching signal, and then, performs the control process.

9. A wireless receiver apparatus comprising a semiconductor circuit for wireless receiving comprising a wireless receiver circuit for converting a wireless received signal having a predetermined radio frequency into an intermediate frequency signal, and outputting the intermediate frequency signal,
    wherein said semiconductor circuit comprises:
    a bias current supply device for supplying a bias current to said wireless receiver circuit;
    a bias current detection device for detecting the bias current, and outputting a detection result;
    a storage device for storing the detection result; and
    a control device for, after controlling said bias current detection device to stop operating thereof, performing a control process for controlling the bias current to decrease when the detected bias current is larger than a predetermined first threshold value and for controlling the bias current to increase when the detected bias current is smaller than a second threshold value smaller than the first threshold value, based on the detection result stored in said storage device.

10. The wireless receiver apparatus as claimed in claim 9, wherein said bias current detection device comprises:

first, second and third current sources each supplying a predetermined identical constant current;

a first resistor provided in said semiconductor circuit, connected to the first current source, and having a predetermined first nominal resistance value; and a second resistor provided in said semiconductor circuit, connected to the second current source, and having a predetermined second nominal resistance value smaller than the first nominal resistance value, wherein the third current source is connected to a reference resistor, wherein the reference resistor is provided outside of said semiconductor circuit, has a predetermined reference resistance value larger than the second nominal resistance value and smaller than the first nominal resistance value, and has an accuracy higher than those of the first resistor and the second resistor, and wherein said bias current detection device detects the bias current based on a result of a comparison of a voltage applied to the reference resistor with a voltage applied to the first resistor, and on a result of a comparison of the voltage applied to the reference resistor with a voltage applied to the second resistor.

* * * * *